(12) United States Patent
Roberge

(10) Patent No.: US 8,726,633 B2
(45) Date of Patent: May 20, 2014

(54) GAS TURBINE ENGINE SYSTEMS AND RELATED METHODS INVOLVING MULTIPLE GAS TURBINE CORES

(71) Applicant: United Technologies Corporation, Hartford, CT (US)

(72) Inventor: Gary D. Roberge, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 38 days.

(21) Appl. No.: 13/680,857

(22) Filed: Nov. 19, 2012

(65) Prior Publication Data
US 2013/0298565 A1 Nov. 14, 2013

Related U.S. Application Data

(62) Division of application No. 11/847,640, filed on Aug. 30, 2007, now Pat. No. 8,336,289.

(51) Int. Cl.
*F02K 3/02* (2006.01)

(52) U.S. Cl.
USPC .................................................. 60/226.1

(58) Field of Classification Search
USPC ............ 60/226.1, 224, 225, 262, 263, 39.15
See application file for complete search history.

(56) References Cited

U.S. PATENT DOCUMENTS

| | | | |
|---|---|---|---|
| 2,465,099 A | 3/1949 | Johnson |
| 2,601,194 A | 6/1952 | Whittle |
| 2,768,504 A | 10/1956 | Wente et al. |
| 2,838,913 A | 6/1958 | Peterson et al. |
| 3,020,711 A | 2/1962 | Pinnes |
| 3,073,549 A | 1/1963 | Griffith |
| 3,154,915 A | 11/1964 | Eichholtz |
| 3,368,352 A | 2/1968 | Hewson |
| 4,021,142 A | 5/1977 | Violette |
| 4,054,030 A | 10/1977 | Pedersen |
| 4,149,374 A | 4/1979 | Barchenko |
| 4,222,235 A | 9/1980 | Adamson et al. |
| 5,282,719 A | 2/1994 | McCarty et al. |
| 5,694,768 A | 12/1997 | Johnson et al. |
| 5,794,432 A | 8/1998 | Dunbar et al. |
| 5,809,772 A | 9/1998 | Giffin, III et al. |
| 6,102,329 A | 8/2000 | Guinan et al. |
| 6,226,976 B1 | 5/2001 | Scott et al. |
| 6,292,763 B1 | 9/2001 | Dunbar et al. |
| 6,415,597 B1 | 7/2002 | Futamura et al. |
| 6,477,829 B1 | 11/2002 | Hunter et al. |
| 6,701,717 B2 | 3/2004 | Flatman et al. |
| 7,770,377 B2 | 8/2010 | Rolt |
| 7,861,533 B2 | 1/2011 | Dooley |

*Primary Examiner* — Phutthiwat Wongwian

(57) ABSTRACT

Gas turbine engine systems and related methods involving multiple gas turbine cores are provided. In this regard, a representative gas turbine engine includes: an inlet; a blade assembly mounted to receive intake air via the inlet; and multiple gas turbine cores located downstream of the blade assembly, each of the multiple gas turbine cores being independently operative in a first state, in which rotational energy is provided to rotate the blade assembly, and a second state, in which rotational energy is not provided to rotate the blade assembly.

19 Claims, 3 Drawing Sheets

GAS TURBINE ENGINE SYSTEMS AND RELATED METHODS INVOLVING MULTIPLE GAS TURBINE CORES

This application is a divisional of U.S. patent application Ser. No. 11/847,640 filed Aug. 30, 2007, which is hereby incorporated by reference.

BACKGROUND

1. Technical Field

The disclosure generally relates to gas turbine engines.

2. Description of the Related Art

Gas turbine engines typically are designed to operate over a broad range of power settings in order to meet varying mission requirements. Unfortunately, various design tradeoffs typically are made in order to accommodate such a broad range of requirements. These tradeoffs oftentimes result in an engine that operates much of the time in a non-optimal manner.

SUMMARY

Gas turbine engine systems and related methods involving multiple gas turbine cores are provided. In this, regard, an exemplary embodiment of a gas turbine engine comprises: an inlet; a blade assembly mounted to receive intake air via the inlet; and multiple gas turbine cores located downstream of the blade assembly, each of the multiple gas turbine cores being independently operative in a first state, in which rotational energy is provided to rotate the blade assembly, and a second state, in which rotational energy is not provided to rotate the blade assembly.

An exemplary embodiment of a gas turbine core assembly for mounting within a gas turbine engine that has a rotatable blade assembly comprises: a first gas turbine core comprising: a first compressor section; a first combustion section operative to receive compressed gas from the first compressor section; a first shaft; a first turbine section operative to impart rotational energy to the first compressor section via the first shaft; and a first drive segment coupled to the first shaft and operative to provide rotational energy from the first shaft to the blade assembly, the first drive segment being offset with respect to a centerline of the blade assembly.

An exemplary embodiment of a method for operating a gas turbine engine comprises: selectively operating at least one of multiple gas turbine cores of the gas turbine engine; and imparting rotational energy from the at least one of the multiple gas turbine cores to a blade assembly, the blade assembly being rotatable to provide a flow of gas to the multiple gas turbine cores.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engine systems and related methods involving multiple gas turbine cores are provided, several representative embodiments of which will be described in detail. In this regard, FIG. 1 is a schematic diagram depicting an exemplary embodiment of a gas turbine engine.

Figure 1:
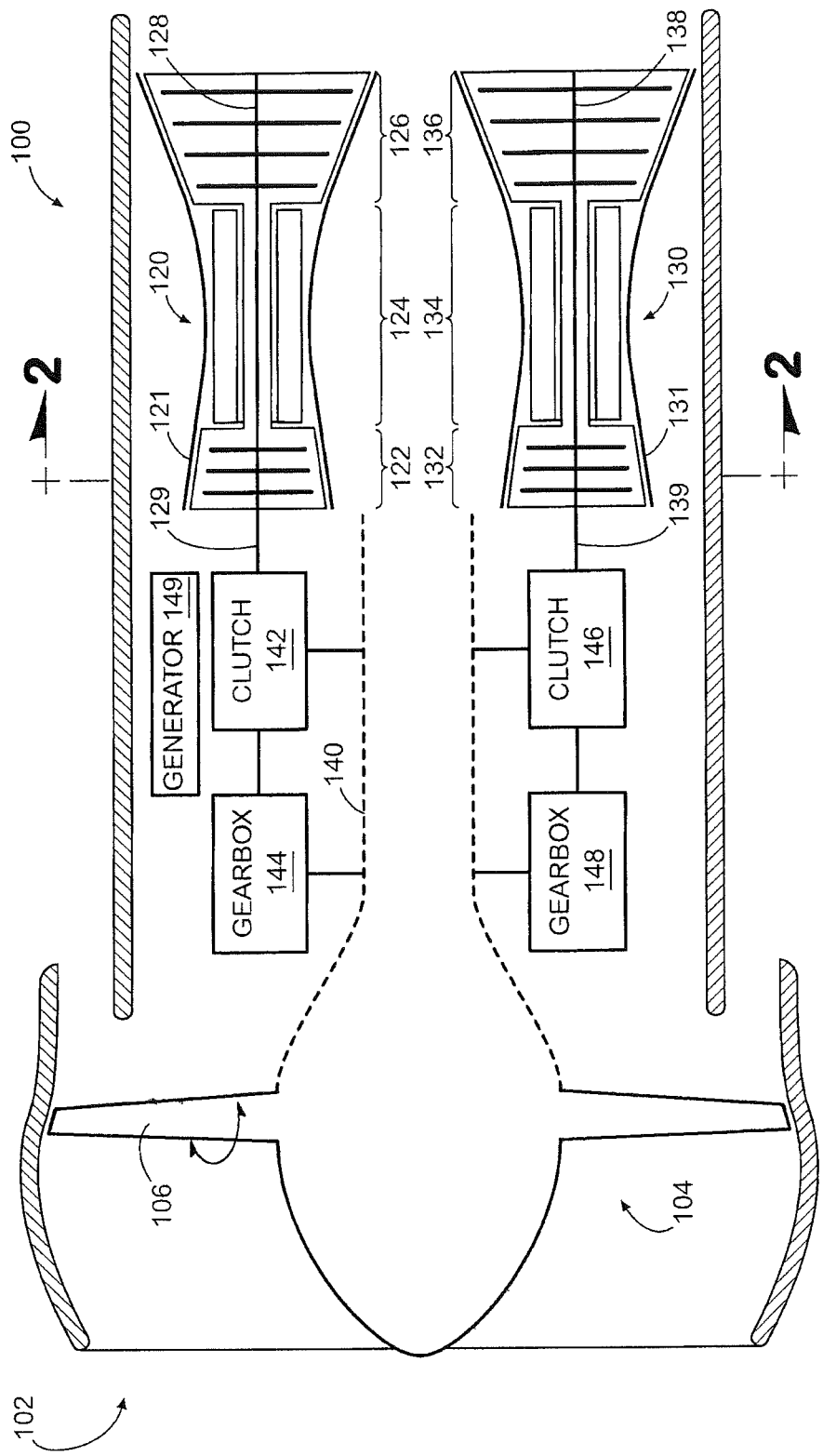
FIG. 1 is a schematic diagram depicting an exemplary embodiment of a gas turbine engine.

As shown in FIG. 1, gas turbine engine 100 incorporates an inlet 102 that provides intake air to a blade assembly 104. In this embodiment, engine 100 is a turbofan, with the blade assembly being configured as a fan incorporating multiple variable pitch blades, e.g., blade 106. However, in other embodiments, the blade assembly could be a set of blades of a compressor of a turbojet, for example. Thus, the concepts described herein should not be construed as being limited to turbofans.

Figure 2:
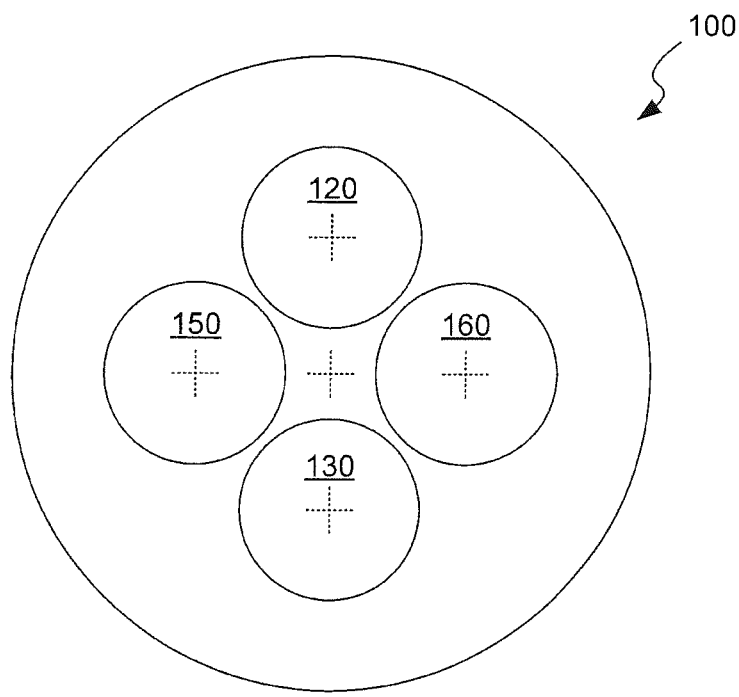
FIG. 2 is a schematic cross-sectional view of the embodiment of FIG. 1.

Downstream of the blade assembly are located multiple gas turbine cores. Specifically, four such gas turbine cores are used in this embodiment although only cores 120, 130 are shown for ease of illustration in FIG. 1. Note that all four cores are depicted in FIG. 2. In other embodiments, various other numbers and arrangements of gas turbine cores can be used.

Each of the gas turbine cores incorporates a casing, a compressor section, a combustion section, and a turbine section, with a shaft interconnecting the compressor section and the turbine section. Thus, gas turbine core 120 includes casing 121, compressor section 122, combustion section 124, turbine section 126 and shaft 128, whereas gas turbine core 130 includes casing 131, compressor section 132, combustion section 134, turbine section 136 and shaft 138. Each of the gas turbine cores is independently operable and can selectively provide rotational energy to the blade assembly. Notably, although depicted as single spool cores, various other configurations can be used in other embodiments.

In the embodiment of FIG. 1, each gas turbine core is coupled to a corresponding clutch and gearbox that can provide rotational energy to the blade assembly via a main shaft 140. Specifically, core 120 is able to apply torque to the blade assembly via a drive segment 129, clutch 142 and gearbox 144, and core 130 is able to apply torque to the blade assembly via drive segment 139, clutch 146 and gearbox 148.

Application of torque to the blade assembly can be accomplished in a variety of manners. For instance, a clutch can be configured to disengage a corresponding core from the blade assembly responsive to available torque of that core dropping below a threshold level. Thus, in such an embodiment, shutdown of the core can initiate the disengagement. In other embodiments, an operating core with fully available torque can be disengaged from the blade assembly by a clutch.

In some embodiments, a gas turbine core can be used to provide electricity. In this regard, engine 100 incorporates a generator 149 that is driven by a core; in this case, core 120. Depending on the mode of operation, the generator can be driven whether or not core 120 is providing torque to the blade assembly. Thus, such a generator can be coupled to a core in various locations, such as between the core and the clutch or between the core and the gearbox, for example.

In operation, one or more of the cores can be shutdown based on the overall power requirements of the gas turbine engine 100. For instance, if power requirements are high, all of the cores can be operating, whereas, if power requirements are low as few as one of the cores could be operating. This tends to improve thermodynamic efficiency of the engine as the operating core(s) can be operated within a high efficiency range of operating parameters.

Notably, efficiency of the engine can be further increased by altering one or more of various gas flow parameters. By way of example, in a high speed mode, in which all of the cores may be operating, fan pressure ratio of the engine can be increased, such as by reducing bypass flow and increasing blade angle of the variable pitch blades of the blade assembly. In contrast, in a reduced speed mode, in which less than all of the cores typically are operating, bypass ratio of the engine can be increased while decreasing the blade angle of the variable pitch blades of the blade assembly.

FIG. 2 is a schematic cross-sectional view of the embodiment of FIG. 1. In particular, FIG. 2 depicts the four gas turbine cores (120, 130, 150 and 160) positioned annularly about the centerline of the gas turbine engine. In this embodiment, each gas turbine core shaft is oriented parallel and offset with respect to the main shaft. Additionally, each opposing pair of gas turbine cores exhibits axial symmetry about the centerline of the main shaft.

Figure 3:
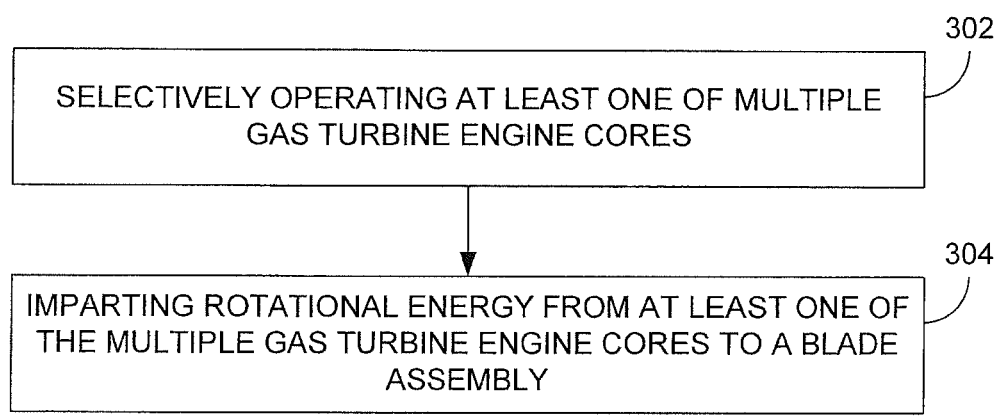
FIG. 3 is a flowchart depicting functionality of an embodiment of a gas turbine engine.

FIG. 3 is a flowchart depicting functionality of an embodiment of a gas turbine engine that includes multiple gas turbine cores. In this regard, the functionality (or method) may be construed as beginning at block 302, in which at least one of multiple gas turbine cores of the gas turbine engine is selectively operated. In block 304, rotational energy from the at least one of the multiple gas turbine cores is imparted to a blade assembly. Notably, the blade assembly is rotatable to provide a flow of gas to the multiple gas turbine cores.

Figure 4:
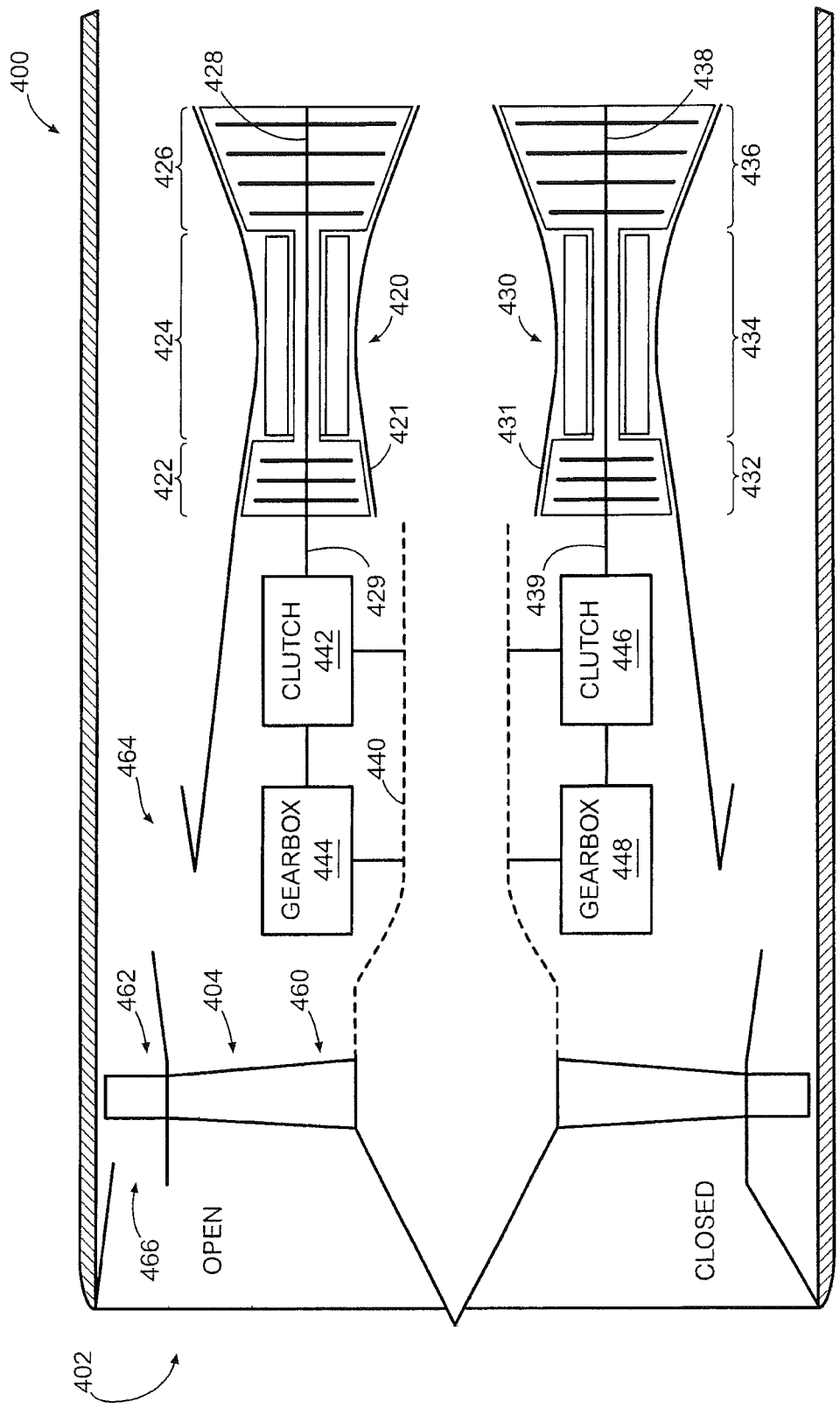
FIG. 4 is a schematic diagram depicting another exemplary embodiment of a gas turbine engine.

Another embodiment of a gas turbine engine is depicted schematically in FIG. 4. As shown in FIG. 4, gas turbine engine 400 incorporates an inlet 402 that provides intake air to a blade assembly 404.

Downstream of the blade assembly are located multiple gas turbine cores. Specifically, four such gas turbine cores are used in this embodiment although only cores 420, 430 are shown for ease of illustration.

Each of the gas turbine cores incorporates a casing, a compressor section, a combustion section, and a turbine section, with a shaft interconnecting the compressor section and the turbine section. Thus, gas turbine core 420 includes casing 421, compressor section 422, combustion section 424, turbine section 426 and shaft 428, whereas gas turbine core 430 includes casing 431, compressor section 432, combustion section 434, turbine section 436 and shaft 438. Each of the gas turbine cores is independently operable and can selectively provide rotational energy to the blade assembly.

In the embodiment of FIG. 4, each gas turbine core is coupled to a corresponding clutch and gearbox that can provide rotational energy to the blade assembly via a main shaft 440. Specifically, core 420 is able to apply torque to the blade assembly via a drive segment 429, clutch 442 and gearbox 444, and core 430 is able to apply torque to the blade assembly via drive segment 439, clutch 446 and gearbox 448.

Notably, the blade assembly 404 of this embodiment is a compound fan incorporating a main (inner) fan 460 and a tip rotator 462. In operation, main fan 460 provides a flow of air to the cores, as well as a flow of bypass air (via primary bypass inlets 464), during operation of the gas turbine engine. The tip rotor 462 selectively provides thrust based on the position of secondary bypass inlets 466. Specifically, in the open position (depicted in the upper portion of FIG. 4), air is provided to the tip rotor for providing thrust, whereas, in the closed position (depicted in the lower portion of the figure), additional air is not provided to the tip rotor.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. By way of example, although the exemplary embodiments described herein involve the use of single stage fans, multiple stage fans could also be used. As another example, while multiple gearboxes also have been described (i.e., each turbine core uses a corresponding gearbox), other embodiments multiple turbine cores could share one or more gearboxes. All such modifications and variations are intended to be included herein within the scope of this disclosure and protected by the accompanying claims.

The invention claimed is:

1. A method for operating a gas turbine engine, comprising:
   selectively operating at least one of multiple gas turbine cores of the gas turbine engine, wherein one of the multiple gas turbine cores is adapted to be independently operated relative to another one of multiple gas turbine cores; and
   mechanically imparting rotational energy from the at least one of the multiple gas turbine cores to a blade assembly, the blade assembly being rotatable to provide a flow of gas to the multiple gas turbine cores;
   wherein each of the multiple gas turbine cores is operative to mechanically impart rotational energy to the blade assembly through a shaft, and includes a compressor; and
   wherein the blade assembly receives intake air from an inlet.

2. The method of claim 1, wherein, in imparting rotational energy, fewer of the gas turbine cores are used to impart rotational energy to the blade assembly than are operating.

3. The method of claim 1, further comprising using rotational energy from at least one of the multiple gas turbine cores to generate electricity.

4. The method of claim 3, wherein the at least one of the multiple gas turbine cores used to generate electricity is not also being used to impart rotational energy, simultaneously, to the blade assembly.

5. The method of claim 1, wherein the blade assembly is included in a fan of the gas turbine engine.

6. The method of claim 1, wherein the blade assembly is included in another compressor of the gas turbine engine.

7. The method of claim 1, further comprising disengaging at least one of the multiple gas turbine cores from the blade assembly.

8. A method for operating a gas turbine engine that includes a blade assembly and a plurality of gas turbine cores, the method comprising:
   operating one or more of the gas turbine cores; and
   selectively mechanically connecting at least one of the one or more of the gas turbine cores to the blade assembly;
   wherein each of the one or more of the gas turbine cores is operative to be selectively mechanically connected to the blade assembly through a shaft, and includes a compressor;
   wherein the blade assembly receives intake air from an inlet.

9. The method of claim 8, wherein the blade assembly is included in a fan of the gas turbine engine.

10. The method of claim 8, wherein the blade assembly is included in another compressor of the gas turbine engine.

11. The method of claim 8, further comprising disengaging at least one of the gas turbine cores from the blade assembly.

12. The method of claim 8, further comprising using rotational energy from at least one of the gas turbine cores to generate electricity.

13. The method of claim 12, wherein the at least one of the gas turbine cores used to generate electricity is not mechanically connected to the blade assembly.

14. A method for operating a turbofan engine that includes a plurality of gas turbine cores arranged around a shaft, the method comprising:
    operating a first of the gas turbine cores and a second of the gas turbine cores of the turbofan engine, wherein the first of the gas turbine cores is adapted to be operated independent of the second of the gas turbine cores; and
    mechanically imparting rotational energy from the first of the gas turbine cores and the second of the gas turbine cores to the shaft;
    wherein the first of the gas turbine cores and the second of the gas turbine engine cores each includes a compressor.

15. The method of claim 14, wherein the shaft is connected to blades of a fan.

16. The method of claim 14, wherein the shaft is connected to blades of another compressor.

17. The method of claim 14, further comprising disengaging a third of the gas turbine cores from the shaft.

18. The method of claim 14, further comprising using rotational energy from at least one of the gas turbine cores to generate electricity.

19. The method of claim 18, wherein the at least one of the gas turbine cores used to generate electricity is not used to simultaneously impart rotational energy to the shaft.

* * * * *